(12) United States Patent
Ito

(10) Patent No.: US 6,408,244 B2
(45) Date of Patent: Jun. 18, 2002

(54) GPS RECEIVER HAVING DR SENSOR SIGNAL SAMPLING FUNCTION

(75) Inventor: Mutsumi Ito, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/818,151

(22) Filed: Mar. 27, 2001

(30) Foreign Application Priority Data

Mar. 28, 2000 (JP) ......................................... 2000-089886

(51) Int. Cl.[7] ................................................ G01C 21/26
(52) U.S. Cl. ...................... 701/213; 701/200; 701/207; 701/216; 701/217; 701/300; 342/357.01; 342/357.06; 342/357.12
(58) Field of Search ................................. 701/200, 207, 701/213, 214, 216, 217, 300; 342/357.01, 357.06, 357.08, 357.09, 357.12; 73/178 R

(56) References Cited

U.S. PATENT DOCUMENTS 5,991,692 A * 11/1999 Spencer, II et al. ......... 701/217
6,029,111 A * 2/2000 Croyle ........................ 701/207

* cited by examiner

Primary Examiner—Gertrude Arthur
(74) Attorney, Agent, or Firm—Pitney, Hardin, Kipp & Szuch LLP

(57) ABSTRACT

A navigation system includes a GPS receiver and a host CPU having a serial interface. The GPS receiver includes a sampling system which samples DR sensor signals at a sampling rate of 60 Hz, and an outputting system which outputs a GPS solution and the sampled data of the DR sensor signals in 1 second cycle in a form of serial data. The host CPU receives a plurality of the sampled data of the DR sensor signals and the GPS solution through the serial interface thereof in 1 second cycle and estimates a location of a vehicle based on the GPS solution and a DR solution.

12 Claims, 4 Drawing Sheets

GPS RECEIVER HAVING DR SENSOR SIGNAL SAMPLING FUNCTION

BACKGROUND OF THE INVENTION

The present invention relates to a GPS receiver used for a navigation system.

A car navigation system employs a GPS receiver, which has functions of receiving GPS signals, measuring a distance between a GPS satellite and the GPS receiver (i.e., a distance between a GPS satellite and a vehicle which is equipped with the car navigation system), and providing a GPS solution (a GPS position and/or a GPS velocity).

Generally, in a predetermined cycle, the GPS receiver updates the GPS solution and outputs the GPS solution and data related to a GPS measurement as a GPS output message in the predetermined cycle to a host CPU (Central Processing Unit), which functions as a host to the GPS receiver in the car navigation system. The host CPU receives the GPS solution and the data related to the GPS measurement and performs various functions, which are required for a car navigation system, such as a dead-reckoning, a map-matching, a route searching, and the like. The data related to the GPS measurement includes, for example, error information included in the GPS solution. Typically, data transmission between the GPS receiver and the host CPU is carried out by serial data transmission.

In general, a GPS receiver is modularized as a component of a navigation system and is mounted in the navigation systems.

Recently, these functions are becoming more complicated. Therefore, a host CPU having higher performance is required to achieve these complicated functions.

Particularly in providing the dead-reckoning function, there are some problems as follows, because the host CPU is required to process a plurality of DR (dead-reckoning) sensor signals. First, in order to process a plurality of dead-reckoning sensor signals, the host CPU is required to include a plurality of interfaces through which the DR sensor signals are transmitted thereto. Second, it is necessary that the host CPU samples the DR sensor signals in a predetermined cycle. Sampling of the DR sensor signals in a predetermined cycle is a significant burden to the host CPU.

FIG. 1 is a flowchart showing a process in which the host CPU controls the interfaces thereof. In FIG. 1, the interfaces of the host CPU include an I/F1 which is an interface to the GPS receiver, an I/F2 which is an interface for receiving a signal from a gyro sensor, an I/F3 which is an interface for receiving a back signal, an I/F4 which is an interface for receiving a speed pulse signal, and an I/F5 which is an interface to a speed pulse signal filter.

The back signal indicates whether the vehicle is going ahead or backward. The speed pulse signal is transmitted from a velocity sensor mounted on the vehicle and has a frequency corresponding to a velocity of the vehicle.

The signal from the gyro sensor is filtered and converted to a digital signal. Then, the converted digital signal is input to the I/F2 of the host CPU. The speed pulse signal is filtered by the speed pulse signal filter and then input to a counter which counts the number of pulses of the speed pulse signal. The number counted by the counter is read by the host CPU via the I/F4. The speed pulse signal filter is a low pass filter of which a cut-off frequency is variable. The cut-off frequency of the speed pulse signal filter varies according to a control signal which is sent from the I/F5 of the host CPU.

The process shown in FIG. 1 is called and executed in the host CPU, for example, in a predetermined cycle, e.g., 1 second. In FIG. 1, S401 and S410 represent that the steps between S401 and S410 repeat 32 times. Every time the steps between S401 and S410 are processed, a variable i is incremented by one, and therefore the variable i is incremented from 0 up to 31. Only when the variable i=0 (S402: YES), the GPS output message is transmitted to the host CPU via the I/F1 (S403). At step S404, the host CPU measures time using a timer which is provided in the host CPU to determine if 1/32 second has passed. If 1/32 second has passed (S404: YES), control proceeds to S405. When control proceeds to step S405, the host CPU restarts measuring time from 0 to determine 1/32 second has passed.

A value of an output voltage of the gyro sensor is transmitted via the I/F2 at S405, and a state of the back signal is transmitted via the I/F3 at S406. Next, the number counted by the counter is transmitted via the I/F4 at S407. At step S408, taking into account a frequency of the speed pulse signal, the host CPU generates the control signal to optimize the cut-off frequency of the speed pulse signal filter. At step S409, the control signal is transmitted from the I/F 5 of the host CPU to the speed pulse filter.

Accordingly, the host CPU obtains one GPS output message and obtains 32 pieces of data of the DR sensors in 1 second cycle.

As described above, to enhance the car navigation system, it is required to execute the sampling of DR sensor signals in a predetermined cycle, to measure time, and to manage a buffer in which the data of the DR sensors is stored. Sampling of DR sensors, measuring time and managing the buffer make the navigation application program in the car navigation program large. Further, a capacity of the host CPU's memory, which is required for the execution of the navigation application program, increases. That is, the host CPU used for the car navigation system must have high performance and also is designed specifically for car navigation use.

On the contrary, if a car navigation system is to be configured with a host CPU that is not specialized for car navigation use, a peripheral circuit for the host CPU should be made complex. In this case, manufacturing cost increases.

Otherwise, the number of DR sensors managed by the host CPU should be reduced. In this case, performance in estimating a location of the vehicle as a car navigation system reduces.

SUMMARY OF THE INVENTION

It is therefore an object of the present invention to provide a navigation system which has high performance of estimating a location of a vehicle and which is configured with a host CPU that is not specialized for car navigation use.

Another object of the present invention is to provide a GPS receiver which has functions required for a car navigation system as well as the GPS measurement function so as to provide a host CPU with information which can reduce a load on the host CPU in a convenient form.

For the object, according to an aspect of the present invention, there is provided a navigation system, which is provided with a GPS receiver including a GPS measurement system that performs a GPS measurement to obtain a GPS solution, and a processor that estimates a location of a vehicle. The processor has an interface to said GPS receiver. The GPS receiver further includes at least one dead-reckoning sensor interface that receives at least one dead-reckoning sensor signal, a sampling system that samples the at least one dead-reckoning sensor signal received through the at least one dead-reckoning sensor interface to obtain first data, and an outputting system that outputs the GPS solution and the first data sampled by the sampling system. The processor receives the GPS solution and the first data through the interface. In this case, the processor performs a dead-reckoning using the first data to obtain a dead-reckoning solution and estimates the location of the vehicle based on the GPS solution and the dead-reckoning solution.

Since the GPS receiver can provide sampled data of the at least one dead-reckoning sensor signal for the processor, the processor can reduce a load of sampling of the at least one dead-reckoning sensor signal. In order to achieve high performance of estimating of the location of the vehicle, the processor is not required to include a plurality of interfaces through which the at least one dead-reckoning sensor signal is transmitted thereto.

Preferably, the at least one dead-reckoning sensor signal sampled by the sampling system may include at least one of an output signal of gyro sensor, a back signal, and a speed pulse signal.

Preferably, the sampling system samples the at least one dead-reckoning sensor signal a plurality of times. In this case, the first data includes a plurality of second data. The second data represents data sampled at the plurality of times, respectively.

In particular case, the GPS measurement system may perform the GPS measurement in a first predetermined cycle, and the sampling system may sample the at least one dead-reckoning sensor signal in a second predetermined cycle. In this case, the outputting system may output the GPS solution and the first data in a third predetermined cycle.

Preferably, the second predetermined cycle is shorter than the first predetermined cycle. Therefore, the first data may include a plurality of pieces of the second data sampled in the second predetermined cycle within a period of the first predetermined cycle.

Preferably, the third predetermined cycle is equal to the first predetermined cycle.

Preferably, the interface of the processor is a serial interface, and the outputting system of the GPS receiver outputs the first data in a form of serial data.

Optionally, the navigation system may include at least one filter that eliminates noise of the at least one dead-reckoning sensor signal.

Preferably, characteristics of the at least one filter is variable. In this case, the processor may vary the characteristics of the at least one filter.

According to another aspect of the present invention, there is provided a GPS receiver, which is provided with a GPS measurement system that performs GPS measurement to obtain a GPS solution, at least one dead-reckoning sensor interface that receives at least one dead-reckoning sensor signal, a sampling system that samples the at least one dead-reckoning sensor signal received through the at least one dead-reckoning sensor interface to obtain first data, and an outputting system that outputs the GPS solution and the first data sampled by said sampling system.

Since the GPS receiver samples the at least one dead-reckoning sensor signal, the GPS receiver can provide the sampled data of the at least one dead-reckoning sensor signal for a host CPU. Therefore, the host CPU can reduce a load of processing dead-reckoning sensor signals.

Preferably, the at least one dead-reckoning sensor signal may include at least one of an output signal of gyro sensor, a back signal, and a speed pulse signal.

Preferably, the sampling system samples the at least one dead-reckoning sensor signal a plurality of times. In this case, the first data includes a plurality of second data. The second data represents data sampled at the plurality of times, respectively.

In particular case, the GPS measurement system may perform the GPS measurement in a first predetermined cycle, and the sampling system may sample the at least one dead-reckoning sensor signal in a second predetermined cycle. In this case, the outputting system may output the GPS solution and the first data in a third predetermined cycle.

Preferably, the second predetermined cycle is shorter than the first predetermined cycle. Therefore, the first data may include a plurality of pieces of the second data sampled in the second predetermined cycle within a period of the first predetermined cycle.

Preferably, the third predetermined cycle is equal to the first predetermined cycle.

Preferably, the outputting system may output the first data in a form of serial data.

BRIEF DESCRIPTION OF THE ACCOMPANYING DRAWINGS

DETAILED DESCRIPTION OF THE EMBODIMENT

Figure 1:
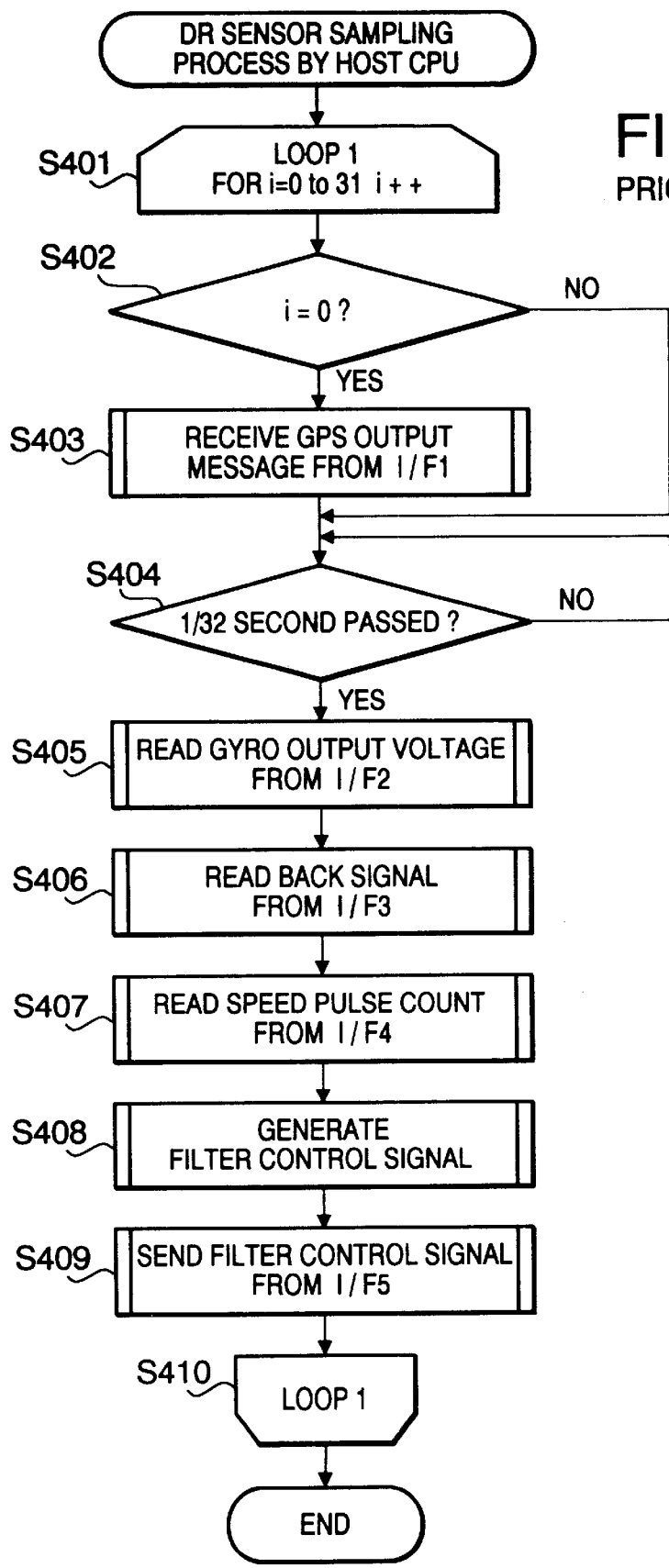
FIG. 1 is a flowchart showing a process in which a conventional host CPU controls interfaces of DR sensors.
Figure 2:
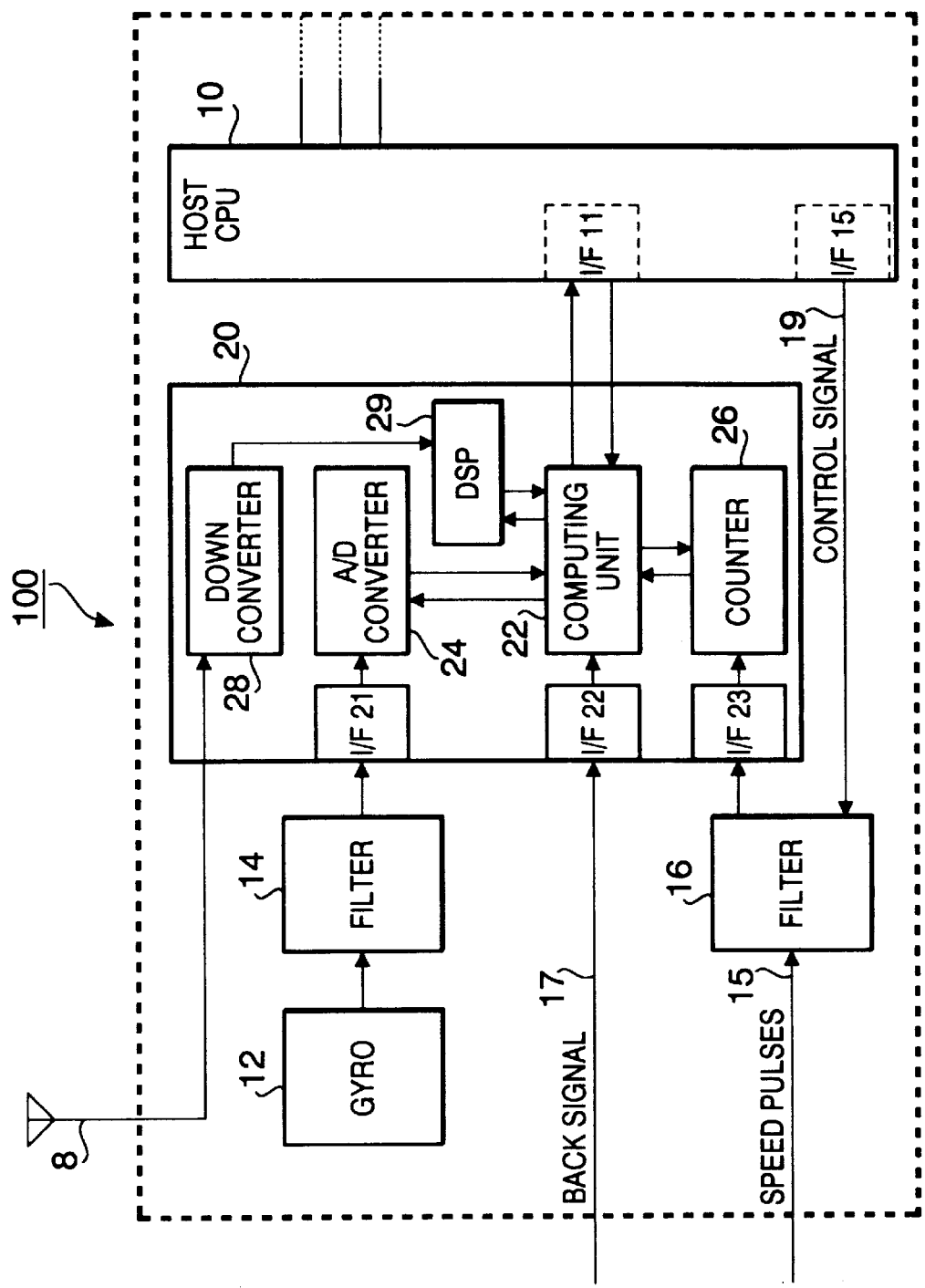
FIG. 2 shows a block diagram of a car navigation system according to the present invention.

FIG. 2 shows a block diagram of a car navigation system 100 according to an embodiment of the present invention. As shown in FIG. 2, the car navigation system 100 is provided with a host CPU 10 which executes a navigation application program, a GPS receiver 20 which performs a GPS measurement, and a gyro 12 which functions as a DR (Dead-Reckoning) sensor. In the car navigation system 100, signals of DR sensors, i.e., an output signal of the gyro 12, a speed pulse signal 15, and a back signal 17 are used to perform a dead-reckoning.

The GPS receiver 20 is provided with a down-converter 28 which downconverts a GPS signal caught by a GPS antenna 8 to a lower intermediate frequency. The down-converter 28 is connected to a DSP 29 which is a digital signal processor. The DSP 29 demodulates the downconverted signal sent from the down-converter 28 under control of a computing unit 22 and obtains navigation data, such as ephemeris, which is sent to the computing unit 22.

The computing unit 22 in the GPS receiver 20 performs the GPS measurement to obtain a GPS solution, in a predetermined cycle, based on GPS signals which were received by the GPS antenna 8. The predetermined cycle is, for example, one second.

The GPS receiver 20 has an I/F 21 which is an interface through which the output signal of the gyro 12 is received, an I/F 22 which is an interface through which the back signal 17 is received, and an I/F 23 which is an interface through which the speed pulse signal 15 is received.

The output signal of the gyro 12 has a DC (direct current) voltage corresponding to an angular velocity in a turning direction of a vehicle in which the car navigation system 100 is equipped. Noise of the output signal of the gyro 12 is eliminated by a filter 14. Then, the output signal of the gyro 12 is converted to digital data by an A/D converter 24 in the GPS receiver 20 and input to the computing unit 22. Operation of the A/D converter 24 is controlled by the computing unit 22.

The speed pulse signal 15 has a frequency corresponding to a velocity of the vehicle. Noise of the speed pulse signal 15 is eliminated by a filter 16, and the noise-eliminated signal is input to a counter 26 which counts the number of pulses of the speed pulse signal 15. The computing unit 22 controls operation of the counter 26. A count value of the counter 26 is read by the computing unit 22.

The filter 16 is a low pass filter of which cut-off frequency is variable. The cut-off frequency of the filter 16 varies according to a control signal 19 transmitted from an I/F15 which is an interface of the host CPU 10. Taking into account a frequency of the speed pulse signal 15, the host CPU 10 generates the control signal 19 to optimize the cut-off frequency of the filter 16. Therefore, occurrence of aliasing in sampling the speed pulse signal 15 can be prevented.

The computing unit 22 samples a digital data of the output voltage of the gyro 12 by controlling the A/D converter 24, a state of the back signal 17, and the count value of the counter 26 at a predetermined sampling rate. The predetermined sampling rate in the computing unit 22 is, for example, 60 Hz. The computing unit 22 sends the sampled data of the DR sensors (i.e., the digital data of the output voltage of the gyro 12, the state of the back signal 17, and the count value of the counter 26) together with a GPS solution and another information related to the GPS measurement, such as error information included in the GPS solution, to the host CPU 10 as a GPS output message in a form of serial data. The GPS output message is outputted every time the GPS solution is calculated in a cycle of one second.

The host CPU 10 receives the GPS output message and estimates a location of the vehicle based on the GPS solution, a result of the dead-reckoning (a DR solution), and the error information included in the GPS solution.

Figures 3A, 3B:
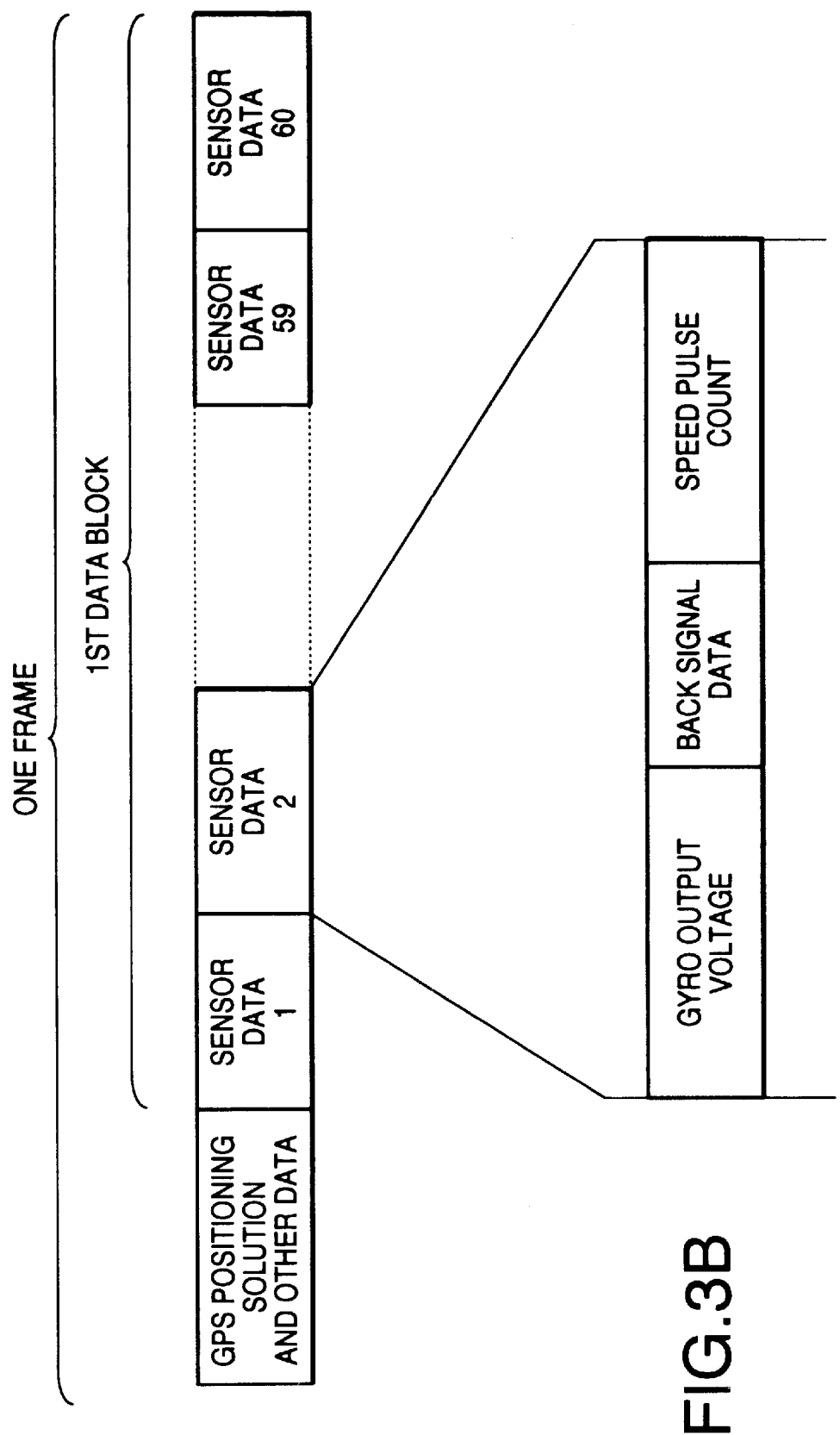
FIG. 3A shows a data structure of a frame of a GPS output message.
FIG. 3B shows a data structure of the sampled data of DR sensors.

FIG. 3A shows a data structure of a frame of the GPS output message sent from the computing unit 22 to the host CPU 10. At the top of the frame, a GPS solution and another information related to the GPS measurement are included. In the next section in the frame, a first data block, which has a plurality of pieces of the sampled data of DR sensors sampled at the sampling rate of 60 Hz within the predetermined cycle of the GPS measurement (i.e., 1 second), is included. In the first data block, 60 pieces of the sampled data of the DR sensors (i.e., sensor data 1 to sensor data 60) are aligned in order in which they are sampled.

FIG. 3B shows a data structure of the sampled data of the DR sensors. As shown in FIG. 3B, each sampled data of the DR sensors includes the output voltage of the gyro 12, the state of the back signal 17, and the count value of the counter 26.

Figure 4:
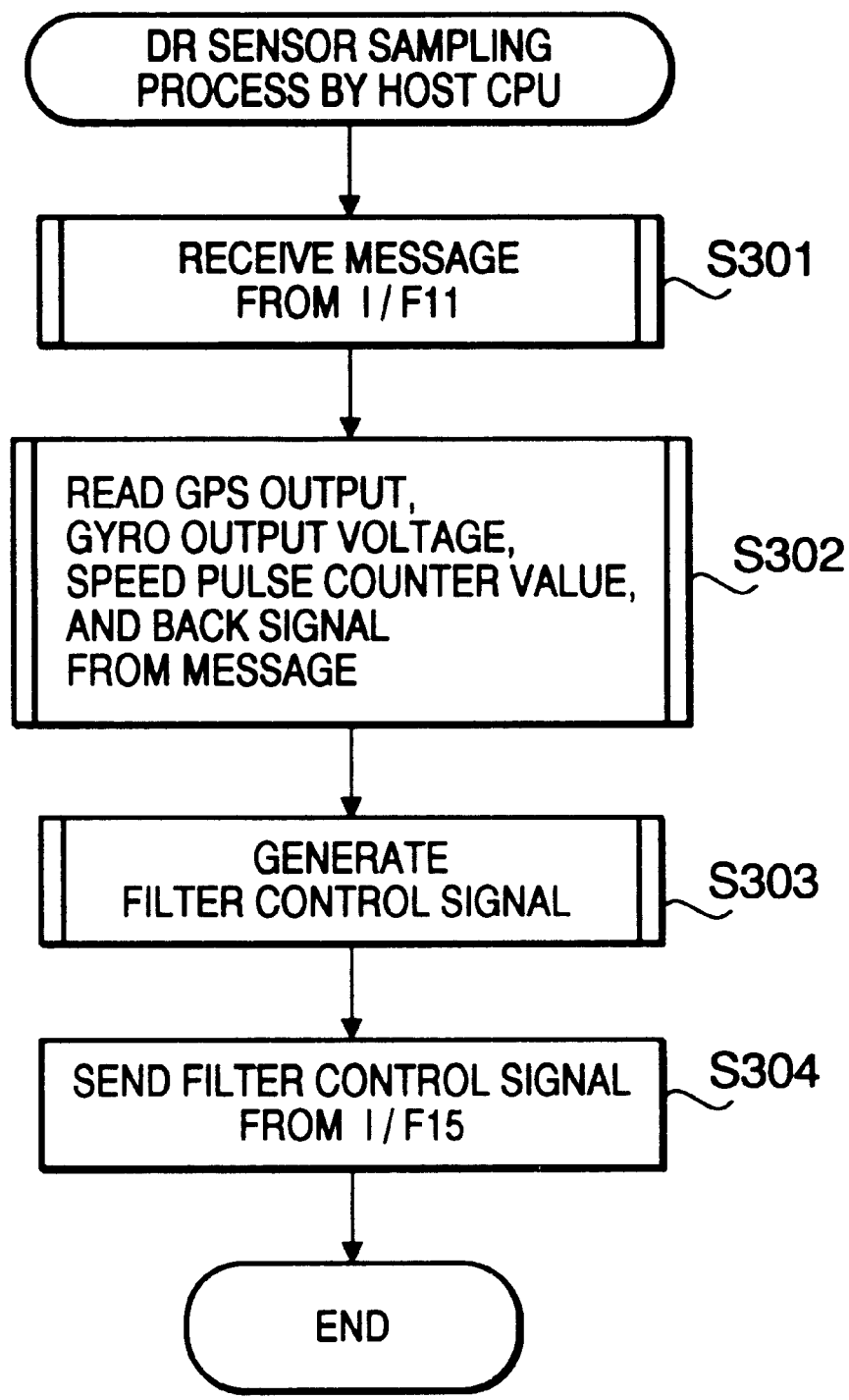
FIG. 4 is a flowchart showing a process in which a host CPU of the car navigation system controls interfaces.

The host CPU 10 receives the frame of the GPS output message shown in FIG. 3A through an I/F11 which is a serial interface thereof. FIG. 4 is a flowchart showing a process in which the host CPU 10 controls the I/F11 and the I/F15. The process shown in FIG. 4 is called and executed, for example, in a cycle of one second. The host CPU 10 first receives the GPS output message through the I/F11 from the GPS receiver 20 (S301). Next, the host CPU 10 obtains the GPS solution, another information related to the GPS measurement, the output voltage of the gyro 12, the count value of the counter 26, and the state of back signal 17 from the GPS output message (S302).

In step S303, according to a frequency of the speed pulse signal 15 determined based on a rate of increase of the count vale of the counter 26, the control signal 19 to optimize the cut-off frequency of the filter 16 is generated. Then, the control signal 19 is sent from the I/F15 to the filter 16 (S304).

As described above, the GPS receiver 20 samples data of DR sensors at a predetermined sampling rate (60 Hz) which is faster than a rate at which a GPS solution is obtained (1 Hz). Therefore, the host CPU 10 can obtain a plurality of pieces of data of the DR sensors together with a GPS solution by only managing a single serial I/O interface (i.e., I/F11) thereof. That is, the host CPU 10 is not required to manage a plurality of interfaces to obtain a plurality of pieces of data of the DR sensors.

Using the higher sampling rate of the DR sensor signals, more detailed data of the DR sensors can be obtained, and accuracy of the dead-reckoning function can be enhanced.

Accordingly, a GPS receiver according to the present invention can provide a car navigation system that exhibits high performance without employing a host CPU which has high performance and specialized particularly for car navigation systems.

If the GPS receiver samples a single DR sensor signal (e.g., the speed pulse signal), it is also possible to enhance performance in estimating a location of the vehicle as a car navigation system without increasing a load on the host CPU.

The present invention is not limited to the embodiment described above. For example, it is possible to incorporate the filter 16 into the GPS receiver 20 to cause adaptive control on the filter 16 to be executed within the GPS receiver 20.

The present disclosure relates to the subject matter contained in Japanese Patent Application No. 2000-89886, filed on Mar. 28, 2000, which is expressly incorporated herein by reference in its entirety.

What is claimed is:

1. A navigation system, comprising:
   a GPS receiver including a GPS measurement system that performs a GPS measurement in a first predetermined cycle to obtain a GPS solution; and
   a processor that estimates a location of a vehicle, the processor having an interface to said GPS receiver,
   wherein said GPS receiver further includes:
      at least one dead-reckoning sensor interface that receives at least on e dead-reckoning sensor signal;
      a sampling system that in a second predetermined cycle samples said at least one dead-reckoning sensor signal received through said at least one dead-reckoning sensor interface to obtain first data wherein said sampling system samples said at least one dead reckoning sensor signal a plurality of times, the first data including a plurality of second data, said second data representing data sampled at said plurality of times respectively; and
      an outputting system that outputs the GPS solution and the first data sampled by said sampling system in a third predetermined cycle, and wherein said processor receives the GPS solution and the first data through said interface, said processor performing a dead-reckoning using the first data to obtain a dead-reckoning solution, and wherein said processor estimates the location of the vehicle based on the GPS solution and the dead-reckoning solution.

2. The navigation system according to claim 1, wherein said at least one dead-reckoning sensor signal sampled by said sampling system includes at least one of an output signal of gyro sensor, a back signal, and a speed pulse signal.

3. The navigation system according to claim 2, wherein the second predetermined cycle is shorter than the first predetermined cycle, and wherein the first data includes a plurality of pieces of the second data sampled in the second predetermined cycle within a period of the first predetermined cycle.

4. The navigation system according to claim 3, wherein said third predetermined cycle is equal to said first predetermined cycle.

5. The navigation system according to claim 4, wherein said interface of the processor is a serial interface, and wherein said outputting system of the GPS receiver outputs the first data in a form of serial data.

6. The navigation system according to claim 5, further comprising at least one filter that eliminates noise of said at least one dead-reckoning sensor signal.

7. The navigation system according to claim 6, wherein characteristics of the at least one filter is variable, and wherein said processor varies the characteristics of the at least one filter.

8. A GPS receiver, comprising:

a GPS measurement system that performs GPS measurement in a first predetermined cycle to obtain a GPS solution;

at least one dead-reckoning sensor interface that receives at least one dead-reckoning sensor signal;

a sampling system that in a second predetermined cycle samples said at least one dead-reckoning sensor signal received through said at least one dead-reckoning sensor interface to obtain first data wherein said sampling system samples said at least one dead-reckoning sensor signal a plurality of times, the first data including a plurality of second data, said second data representing data sampled at said plurality of times respectively; and an outputting system that outputs the GPS solution and the first data sampled by said sampling system in a third predetermined cycle.

9. The GPS receiver according to claim 8, wherein said at least one dead-reckoning sensor signal includes at least one of an output signal of gyro sensor, a back signal, and a speed pulse signal.

10. The GPS receiver according to claim 9, wherein the second predetermined cycle is shorter than the first predetermined cycle, and wherein said first data includes a plurality of pieces of the second data sampled in the second predetermined cycle within a period of the first predetermined cycle.

11. The GPS receiver according to claim 10, wherein said third predetermined cycle is equal to said first predetermined cycle.

12. The GPS receiver according to claim 11, wherein said outputting system outputs the first data in a form of serial data.

* * * * *